Figure 24:
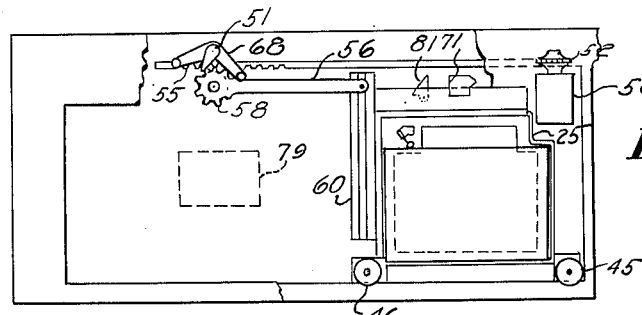

Feb. 9, 1954     E. R. GOLDFIELD ET AL     2,668,913
X-RAY APPARATUS
Filed April 5, 1949     10 Sheets-Sheet 1
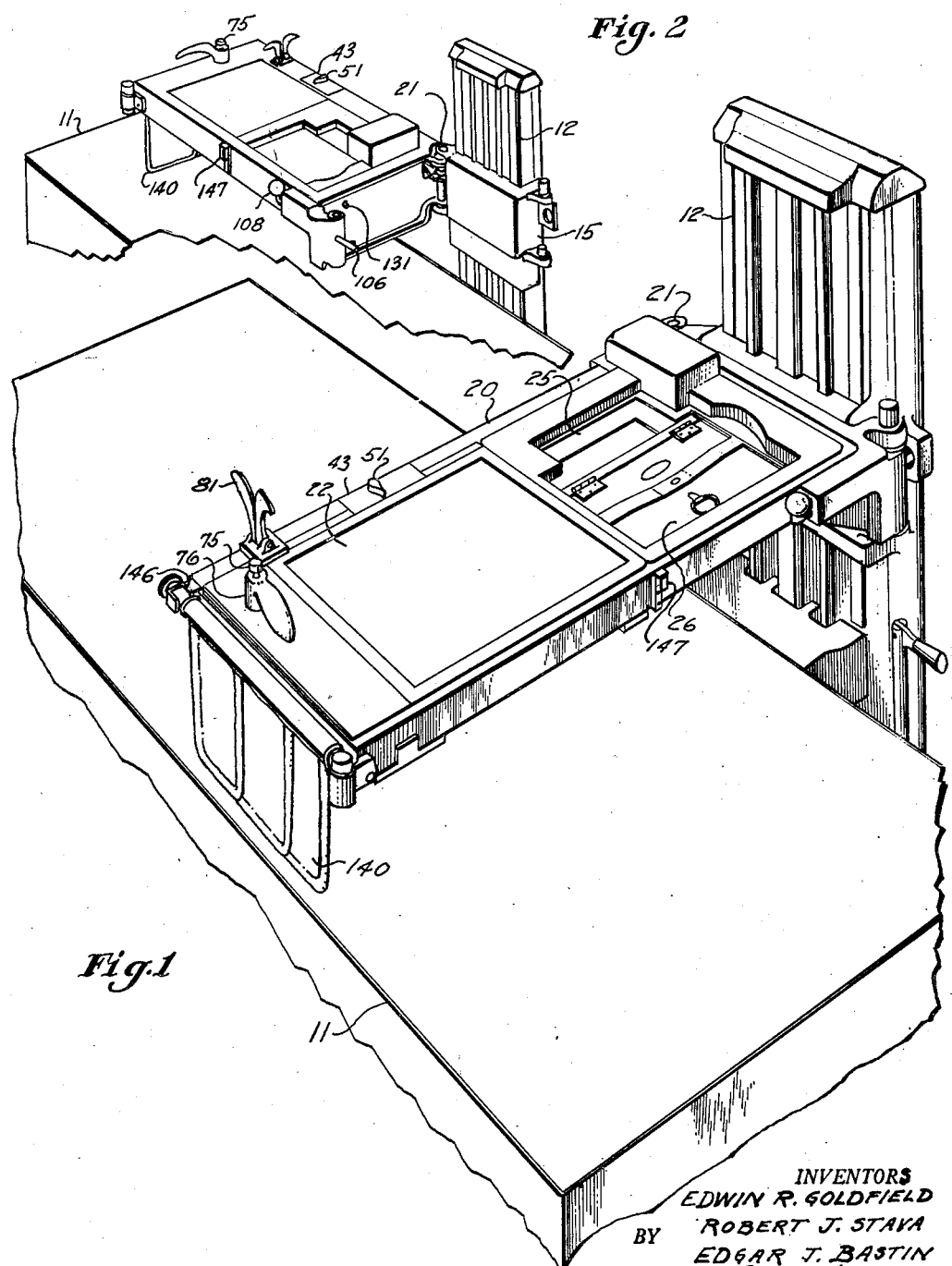
INVENTORS
EDWIN R. GOLDFIELD
BY ROBERT J. STAVA
EDGAR J. BASTIN
Bates, Teare & M°Bean
Attorneys

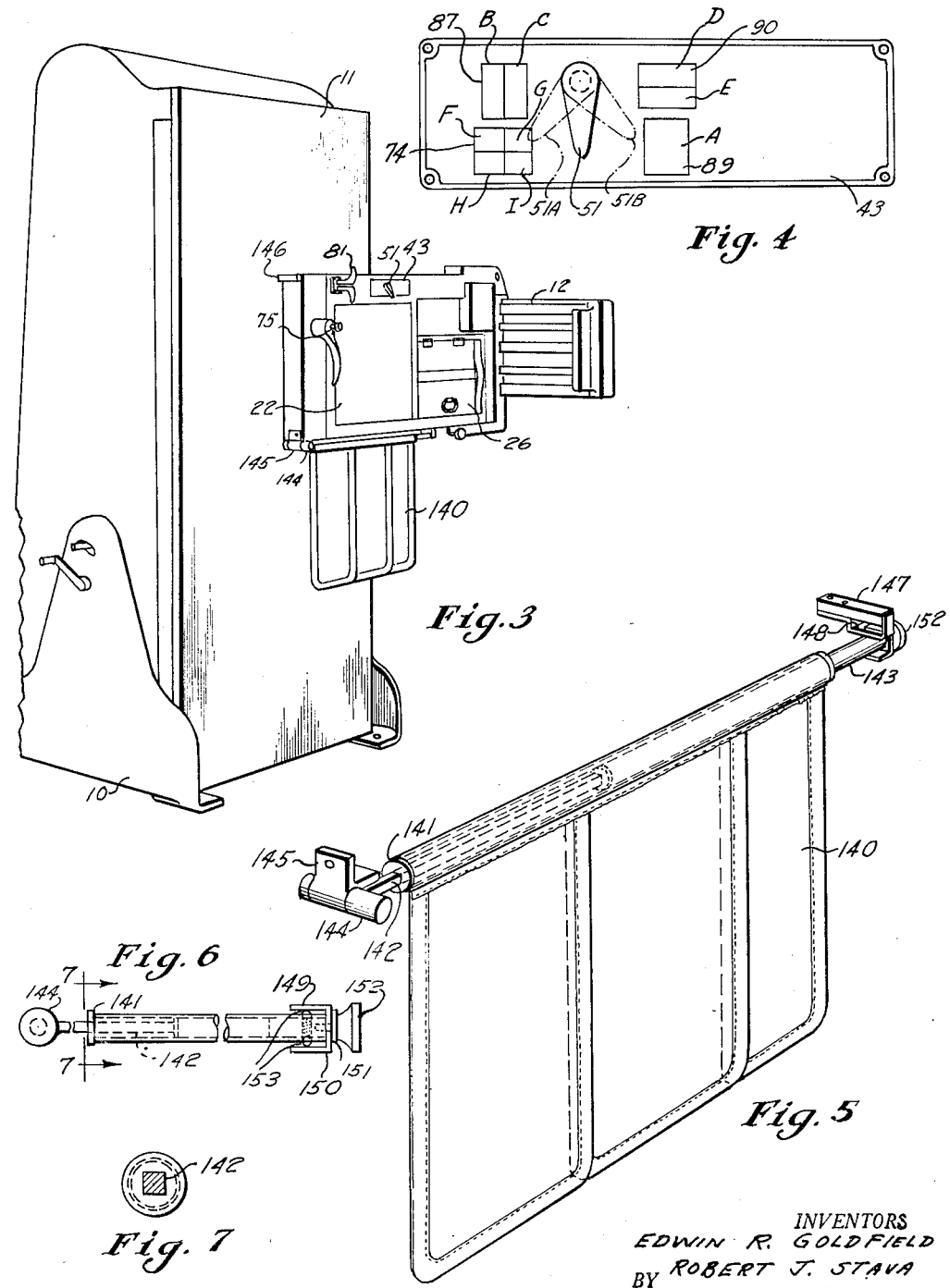

Feb. 9, 1954     E. R. GOLDFIELD ET AL     2,668,913
X-RAY APPARATUS
Filed April 5, 1949     10 Sheets-Sheet 3
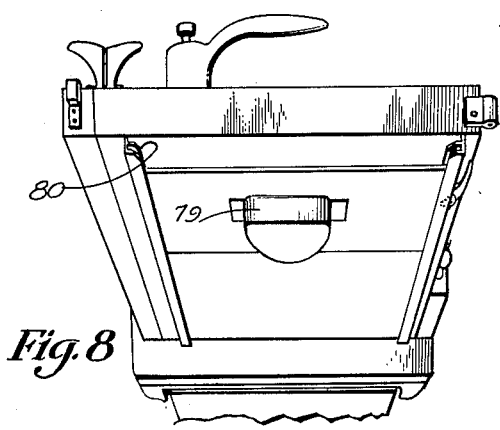
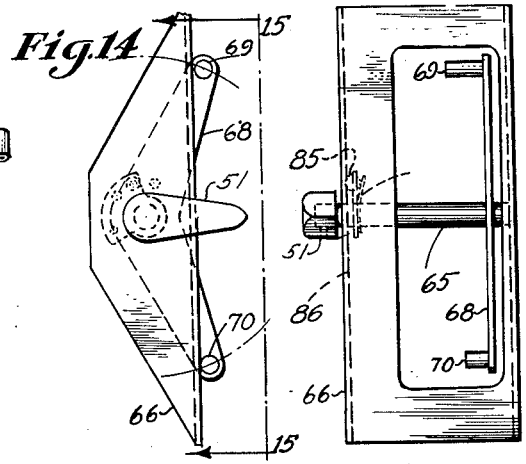
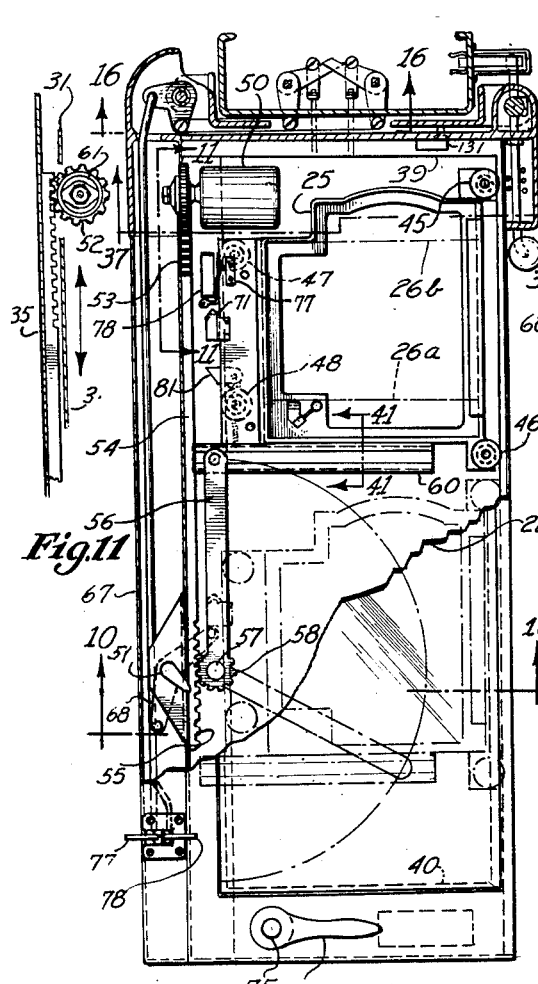
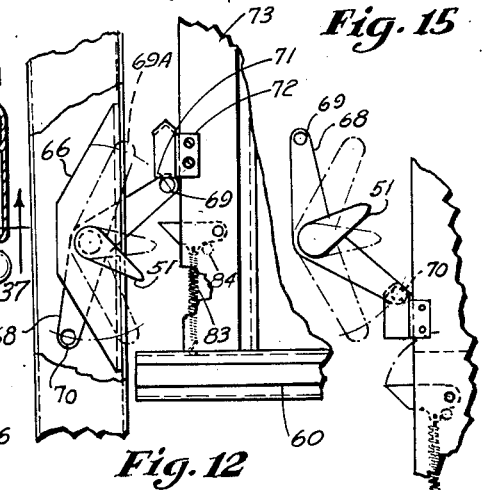
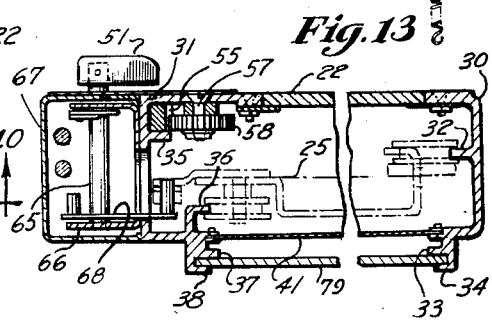
INVENTORS
EDWIN R. GOLDFIELD
ROBERT J. STAVA
EDGAR J. BASTIN
BY
Bates, Peare & McBean
Attorneys

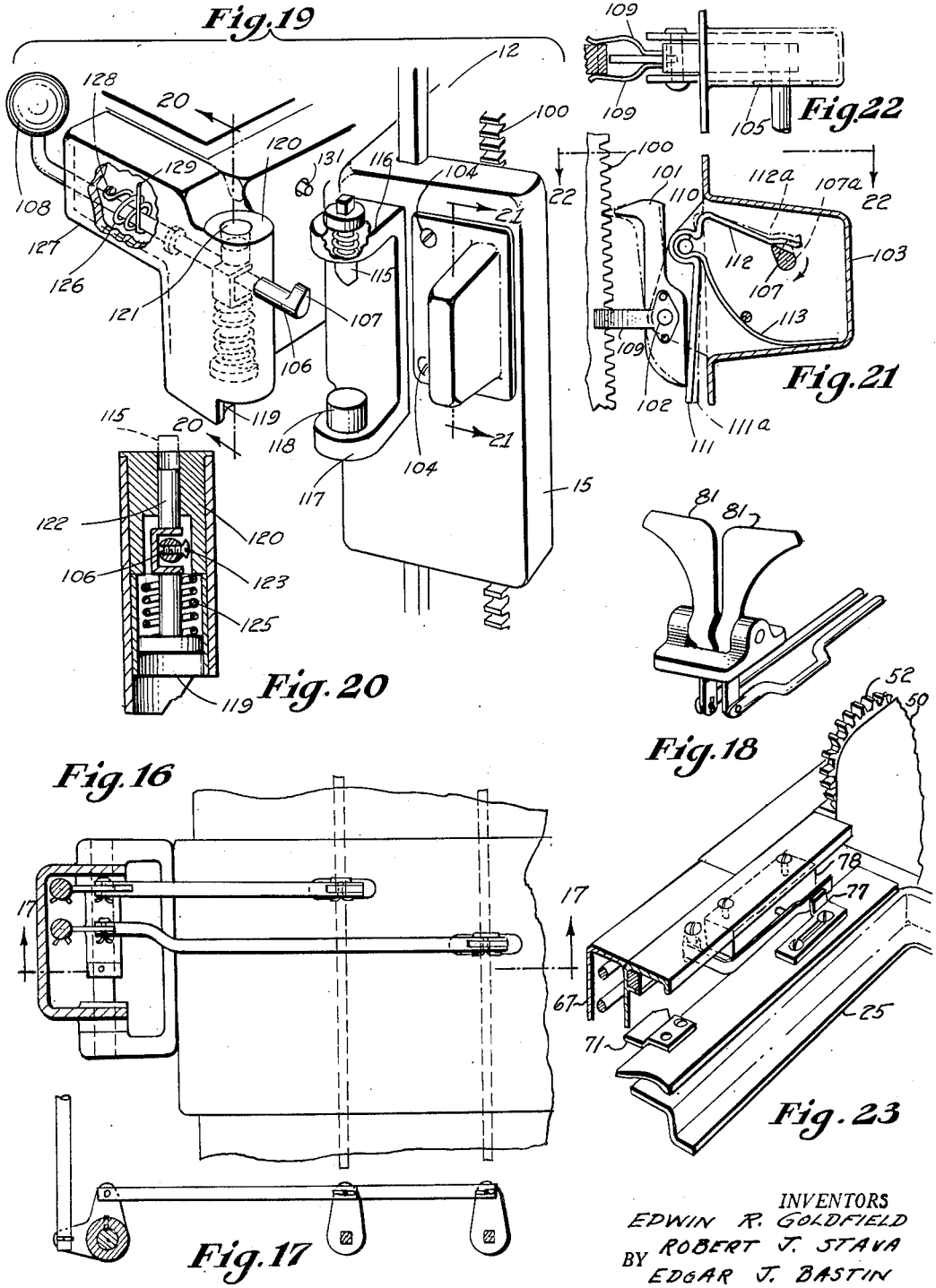

INVENTORS
EDWIN R. GOLDFIELD
ROBERT J. STAVA
BY EDGAR J. BASTIN
Bates Peare & McBean
Attorneys Feb. 9, 1954   E. R. GOLDFIELD ET AL   2,668,913
X-RAY APPARATUS
Filed April 5, 1949   10 Sheets-Sheet 7

INVENTORS
EDWIN R. GOLDFIELD
ROBERT J. STAVA
BY EDGAR J. BASTIN
Bates, Teare & McBean
Attorneys

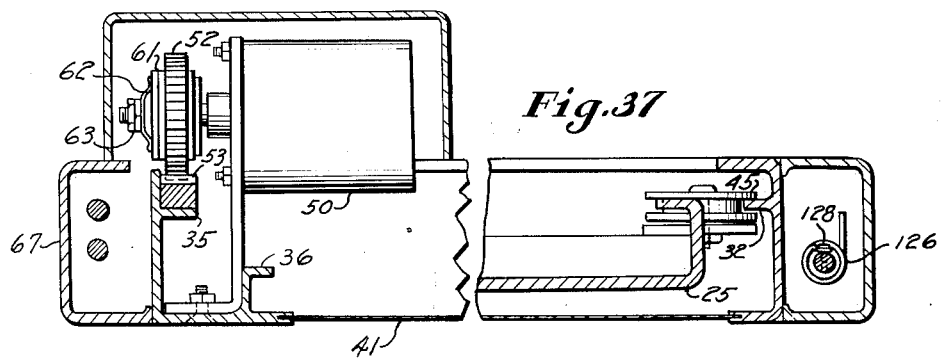
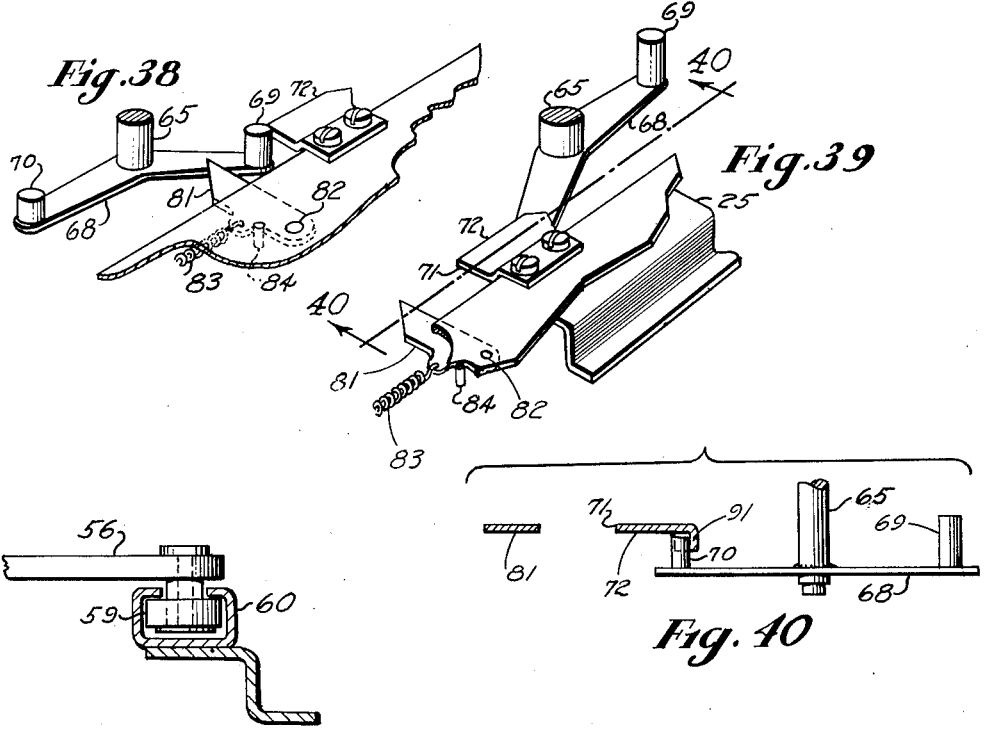

Feb. 9, 1954  E. R. GOLDFIELD ET AL  2,668,913
X-RAY APPARATUS
Filed April 5, 1949  10 Sheets-Sheet 9

INVENTORS
EDWIN R. GOLDFIELD
BY ROBERT J. STAVA
EDGAR J. BASTIN
Bates, Teare & McBean
Attorneys

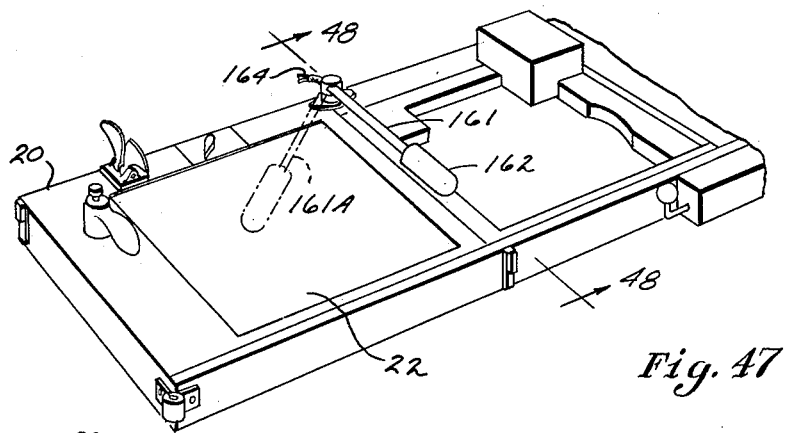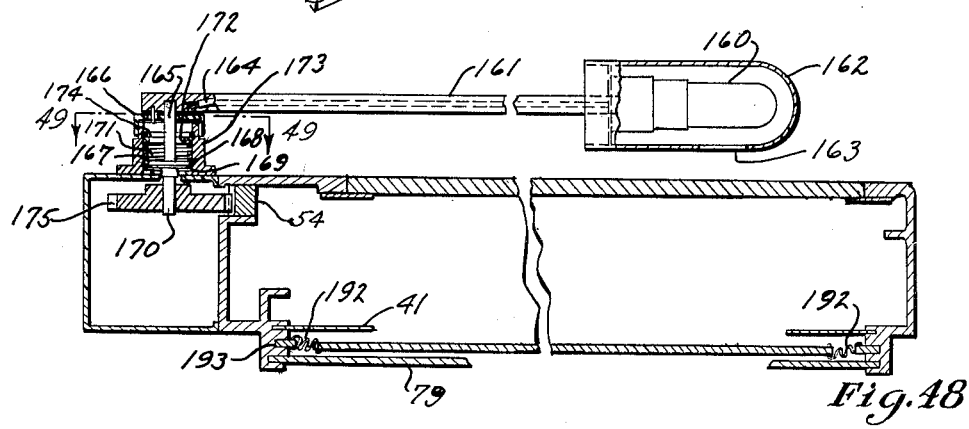

Patented Feb. 9, 1954

2,668,913

UNITED STATES PATENT OFFICE 2,668,913

X-RAY APPARATUS

Edwin R. Goldfield and Robert J. Stava, University Heights, and Edgar J. Bastin, Cleveland, Ohio, assignors to Picker X-Ray Corporation, Waite Manufacturing Division, Inc., Cleveland, Ohio, a corporation of Ohio Application April 5, 1949, Serial No. 85,686

23 Claims. (Cl. 250—62)

This invention relates to improvement in X-ray apparatus, and particularly to equipment which is known in the trade as a "spot film" device.

In practice, a spot film device which is adapted for both fluoroscopy and radiography includes a fluoroscopic screen arm and cassette carriage which are mounted for movement as a unit upon a column. The arm is moved about by the operator for the purpose of scanning an area for pathology or abnormalities, and whenever an area is located, of which a record is desired, the screen arm is held in a steady position until a cassette carrier with a loaded cassette therein can be moved over the intended region and an exposure of the film can be made.

One form of device heretofore used for such purpose has necessitated a manually operable mechanism for moving the cassette from a position of storage to a position of exposure, but that arrangement was objectionable in that it required the operator to use one hand for manipulating the cassette carrier while using the other to hold the screen arm in the desired position.

Another effort to overcome the foregoing objection embodied the utilization of a spring that is a motivating mechanism for the cassette carrier, but that is objectionable in that it requires manual resetting after each exposure, and moreover requires the use of a manually operated tripping device as well as additional mechanism for checking or controlling the speed of the film carrier, and stopping it at the precise position required within the screen arm. The checking mechanism usually comprised an air or liquid device which increased the complexity of the equipment. While the apparatus functioned to move the cassette, nevertheless it likewise required the examiner to use one hand for controlling the position of the arm and the other for actuating the resetting mechanism after each exposure, whereas it is desirable that the latter hand be free for controlling the position of the patient or palpating the area of which the record is to be made.

One of the objects of the present invention, therefore, is to make a spot film device wherein the examiner may use one hand for manipulating the screen arm, as well as the mechanism for moving the cassette from storage to exposure position and return, while using the other hand for maintaining the patient in the proper position, and, if necessary, palpating the region at about the time of making the exposure. The invention contemplates additionally a mechanism by means of which two exposures can be successively made quickly and expeditiously without necessitating removal of the examiner's hands from the positions aforesaid.

Additional objects are to simplify and to reduce the number of controls and to provide mechanism by means of which the examiner may readily ascertain and correctly operate the control for selecting the desired size of radiographic record. The invention includes additionally a frame construction which will lighten the weight of the screen arm and which will enable the arm and its associated mechanism to be housed in a compact structure. Other features include the application of controls and accessibility thereof so as to minimize the chances for error by the examiner during the operation of the device.

An additional object of the present invention is to incorporate a photo-timing tube into the spot film apparatus in such manner as to sweep the tube into and out of the scanning position (directly over the center of the fluorescent screen) and to accomplish such movement automatically consequent upon movement of the cassette into and out of exposure position respectively.

An additional feature of the present invention is the supporting means for a grid by means of which vibration thereof may be set up automatically during exposure, whereby the presence of grid lines in the film will be avoided, and whereby the advantage of a grid will be obtained in reducing to a minimum the secondary scattering from the patient.

In the drawings, Fig. 1 is a perspective view of a portion of a table suitable for X-ray purposes and having the present invention associated therewith; Fig. 2 is a similar perspective view illustrating the screen arm swung to a position at substantially a right angle from that illustrated in Fig. 1; Fig. 3 is a perspective view illustrating the table of Fig. 1 swung to a vertical position, with the equipment of the present invention shown in connection therewith; Fig. 4 is an illustrative diagram illustrating the control lever and indicating device for use in connection with the operation of the invention; Fig. 5 is a perspective view of the apron protector and its mounting; Fig. 6 is a front elevation of the telescopic support mechanism for the apron shown in Fig. 5 without the apron being mounted thereon; Fig. 7 is a section taken on the plane indicated by the line 7—7 of Fig. 6; Fig. 8 is a perspective view showing the bottom portion of the screen arm; Fig. 9 is a top plan view of the screen arm with a portion thereof cut away and showing the frame and mechanism for actuating the cassette tray in accordance with the present invention; Fig. 10 is a section taken on the plane indicated by the line 10—10 in Fig. 9; Fig. 11 is a section taken on the plane indicated by the line 11—11 in Fig. 9, but on a scale larger than that shown in Fig. 9; Figs. 12, 13 and 14 are diagrammatic views illustrating positions of the mechanism which is utilized for controlling the extent of movement of the cassette carrier; Fig. 15 is an elevational view of the device shown in Fig. 14, taken in a direction indicated by the line 15—15 of Fig. 14; Fig. 16 is a sectional view taken on a plane indicated by the line 16—16 in Fig. 9; Fig. 17 is a section taken on a plane indicated by the line 17—17 in Fig. 16; Fig. 18 is a perspective view illustrating the shutter actuating levers; Fig. 19 is a perspective view illustrating the swinging mechanism for latching the screen arm to its bracket; Figs. 20 and 21 are sections taken on planes indicated by the correspondingly numbered lines in Fig. 19; Fig. 22 is a section taken on a plane indicated by the line 22—22 in Fig. 21; Fig. 23 is a perspective view showing a detail view of the mechanism for stopping the tray actuating motor; Figs. 24 to 27, inclusive, are top plan views illustrating the various positions of the cassette carrier during serial movement of it in accordance with the plan of the present invention; Fig. 28 is a view similar to Fig. 24, but illustrating the cassette carrier in a reversed position in the frame from that shown in Fig. 23; Figs. 29 to 32 inclusive, are views illustrating the various positions of the cassette carrier with the cassette inserted in a position different from that of Figs. 23 to 27, inclusive; Figs. 33 to 36 are top plan views illustrating various positions of the cassette carrier with the cassette in a position for making a full-size exposure; Fig. 37 is a section taken on a plane indicated by the line 37—37 in Fig. 9; Figs. 38 and 39 are perspective views illustrating details of the operation of the stop mechanism that is used for limiting movement of the tray; Fig. 40 is a section taken on a plane indicated by the line 40—40 in Fig. 39; Fig. 41 is a section taken on a plane indicated by the line 41—41 in Fig. 9; Figs. 42 to 45, inclusive, are wiring diagrams; Fig. 46 is a section similar to Fig. 10, but showing a modification of the invention; Fig. 47 is a perspective view of a spot-film device having a photo-timing tube attached thereto and mounted for swinging movement with respect to the fluoroscopic screen; Fig. 48 is a section taken on a plane indicated by the line 48—48 in Fig. 47; Fig. 49 is a section taken on a plane indicated by the line 49—49 in Fig. 48, and Fig. 50 is a top plan view of a grid, illustrated in Fig. 48, with the grid removed from the screen arm and showing the means for suspending it within the grid frame.

The apparatus shown in the drawings is illustrated in connection with a base 10 which supports a tiltable table 11. In Fig. 1 the table is shown in horizontal position, but in Fig. 3 is shown in vertical position. The usual X-ray tube is disposed within the table upon a support (not shown in its entirety but a portion of which is shown at 8 in Fig. 1) which is adapted to traverse the length of the table in the usual way in conjunction with a column 12, as shown for example in Letters Patent of the United States, No. 2,259,036 issued October 14, 1941, wherein provision is made for traversing movement of the support longitudinally and transversely of the table structure. The column has a bracket 15 slidably mounted thereon, while an arm 20 is pivoted at 21 to the bracket and is supported thereby. The arm 20 contains a fluoroscopic screen 22 and has provision for supporting a cassette carrier or tray 25 and for moving the tray with relation to the arm for radiographic purposes.

The normal position of the arm 20 is shown in Fig. 1 for horizontal fluoroscopic and radiography, but it is adapted to be swung away from the bracket as is shown in Fig. 2, so as to clear the surface of the table and to facilitate handling of a patient. The present invention includes mechanism for moving the tray automatically with relation to the arm, so as to permit film exposures to be made either singly or serially with maximum speed and minimum effort by the operator.

The screen arm 20 constitutes a hollow frame having longitudinally extending members 30 and 31 which are generally preferably extruded channel-shaped members with longitudinally extending ribs thereon, as indicated at 32 to 38, inclusive, in Fig. 10. The longitudinal bars are connected by end bars 39 and 40, thus making a hollow frame which is closed by a bottom plate 41. The top is partially closed by the fluoroscopic screen 22, thus leaving a well which is normally occupied by the tray 25 during cassette-receiving position. A cassette 26 is adapted to be positioned within the tray, either in a direction extending longitudinally of the screen arm, as is shown in full lines in Fig. 1, or transversely of the arm, as is shown by the dotted lines 26A and 26B in Fig. 9. The position of the cassette within the tray is determinative of the shape and position of the record to be made. Thus, when the cassette is disposed transversely of the arm, either a full exposure will be made, as indicated at A in Fig. 4, or half-size exposures will be made, as indicated at B and C in Fig. 4. When the tray is disposed longitudinally of the arm, then either half-size exposures, as are indicated at D and E can be made, or quarter-size exposures, as indicated at F to I, inclusive of Fig. 4 can be made. The indications on Fig. 4 form part of a panel or nameplate 43 which is affixed to the arm 20 at one side of the screen 22, and the representations A to I, inclusive, are filled with fluorescent paint, whereby they will glow in the dark in the examination room. This, therefore, is an aid to the examiner in identifying quickly the shape and size of exposure which is to be made.

The cassette tray is normally positioned at the end of the arm adjacent to the column, where it is exposed to view, and is in a position for reception of the cassette. The tray is supported upon four grooved rollers, two of which are indicated at 45 and 46 as engaging the rib 32, the other two of which are indicated at 47 and 48 as engaging the rib 36. The ribs 32 and 36 thus provide a track extending for substantially the full length of the screen arm, and enable the tray to be moved into the tunnel beneath the screen whenever a record is desired.

The present invention contemplates the use of an electric motor 50 for moving the tray and includes mechanism for automatically stopping the tray at a predetermined location in accordance with the position required for the shape and size of record to be made. The position at which the tray is stopped in its movement into the screen tunnel is selectively controlled by the setting of an indexing lever 51, which is positioned above the nameplate 43 and is disposed intermediate the contours of the cassette positions shown thereon. The lever 51 is shiftable to the positions indicated by the broken lines 51A or 51B, and such action operates to interpose a stop into the path of travel of the tray in a manner which will hereinafter be more fully set forth.

The mechanism for connecting the motor 50 to the tray includes a pinion 52 which is adapted to mesh with rack teeth 53 on a bar 54. As viewed in Fig. 9, the rack teeth are disposed on the upper side of the bar while additional rack teeth 55 are disposed on the side of the bar and adjacent the opposite end thereof. The bar is positioned within the channel formed by the rib 35 and side and top portions of the longitudinal member 31, and is adapted for sliding reciprocatory movement therein, as indicated by the arrows in Fig. 11.

Movement of the rack bar is utilized for reciprocating the tray, and the mechanism for accomplishing such purpose includes a link 56 which is pivotally mounted at 57 to the frame, and which has gear teeth 58 adapted to mesh with the rack teeth 55. The other end of the link carries a roller 59 which is mounted within a channel-shaped guideway 60 that is carried by the tray. The arrangement is such that when the tray is in the cassette-receiving position, the link 56 is substantially parallel to the side bars of the frame, whereby the tray is effectively locked against movement with respect to the frame.

The connection between the motor and rack bar includes a slip-clutch indicated in general at 61, the tension of which may be adjusted by means of a spring clip 62 and a nut 63. The function of the clutch is to permit a positive and abrupt stoppage of the tray movement without stopping the motor rotation. This arrangement enables the tray to be stopped selectively in any desired position beneath the fluoroscopic screen without the need for complex operating parts and controls therefor.

The mechanism for selectively stopping the tray in any required position is controlled by the indexing lever 51 which is fixed to a pin 65 that is journalled in a bracket 66, as is best shown in Fig. 10. The bracket is disposed within a housing 67 that extends lengthwise of the frame and is attached to the longitudinally extending bar 31. Affixed to the lower end of the pin 65 is a plate 68 which may have the shape generally of a boomerang, and which carries adjacent one of its ends a relatively long pin 69 and adjacent the other end a relatively short pin 70. The shape of the plate 68 is such that when the indexing lever 51 is in the central position as shown by the full line in Fig. 4, and by the illustration of Fig. 14, the pins 69 and 70 are not interposed in the path of the moving tray as a result of which the tray is permitted to move into the tunnel to the extreme position. Such extreme position is attained when the link 56 shall have been rotated substantially 180° about the axis of the pivot 57.

When the indexing lever is moved to the dotted line position 51A, that is the left as viewed in Fig. 4, then the relatively long pin 69 is swung from the dotted line position 69A of Fig. 12 to the full line position, where it is interposed in the path of a shouder or stop 71. The abutment 71 may comprise the end of a bracket 72 that is affixed to and extends laterally from the side bar 73 of the tray. The bracket is so located on the bar as to stop the tray in such position that the center of the radiation beam is in registration with the center of the quarter-section of film, represented by F in the illustration of Fig. 4. At such time the cassette is mounted in the tray in the position illustrated in Fig. 1, which corresponds to the diagram 74 of Fig. 4. Moreover, movement of the tray into the tunnel is initiated by closing an electric circuit to the motor 50, which is accomplished by depressing a push-button switch 75 which projects through the screen arm handle 76. The handle is affixed to the arm so as to facilitate movement of it for fluoroscopic observation.

The electrical circuit for the motor is such that so long as the button 75 is depressed, the motor continues to rotate in a direction to urge the tray into the screen tunnel. As soon, however, as the stop 71 on the tray engages the pin 69, then further motion of the tray is arrested abruptly while the motor rotation continues. At such time the clutch 61 is slipping and there is thus a constant pressure of the tray against the stop pin 69, which operates to hold the tray firmly in the desired position.

To retract the tray, the operator need only release the pressure on the button 75, whereupon the circuit arrangement is such as to reverse the direction of motor rotation, thereby moving the tray out of the tunnel until a stop 77 thereon strikes a limit switch 78 and breaks the circuit to the motor.

The customary shutter control levers 200 and 201 are positioned in close proximity to the handle 76 for convenience of operation whenever desired. As shown in Letters Patent of the United States No. 2,097,095 issued October 26, 1937, it is old in the art to provide for shutter opening adjustment by means of levers which are placed adjacent the fluoroscopic screen. As applied to the present application, the shutter control levers 200 and 201 are pivotally connected (Fig. 18) at 202 and 203 to rods 204 and 205 respectively. The latter extend lengthwise of the arm 20 and are pivotally connected at their opposite ends to bell crank levers 206 and 207 respectively (Figs. 16 and 17). The bell crank levers are mounted for swinging movement upon the pivot pin 21 and are respectively connected by links 208 and 209 to arms 210 and 211 respectively. Each of the latter has a non-circular opening to receive a complementary shaped bar 212 and 213 respectively, the latter of which are disposed vertically and are journalled at their ends in the column 12. The lower ends of the bars are then suitably connected to arms 214 and 215 (Fig. 9) which in turn are connected to the ends of shutter control rods 216 and 217 respectively. As shown in Fig. 17, suitable clearance openings are provided in the bracket 15 for the arms 210 and 211 respectively, to permit the arm 20 to be swung about the pivot 21 without disturbing the shutter control connections.

In Figs. 24 to 28, inclusive, the various positions of the cassette in the tray and of the tray in the screen arm are shown for a sequence of operations in the making of radiographic exposures of one-quarter size. Thus, in Fig. 24, the indexing member 51 is moved to the left, or to the position indicated by the broken lines 51A in Fig. 4, and the cassette is placed in the tray with its long dimension extending longitudinally of the screen arm. At such time the pin 69 is interposed in the path of the tray so that when the motor is energized, the tray will be moved from the position of Fig. 24 to Fig. 25. Whenever an exposure of a predetermined size is to be made, then it is to be understood that a mask 79 for that size will be inserted in the runway 80 therefor on the bottom of the screen arm.

Figure 25:
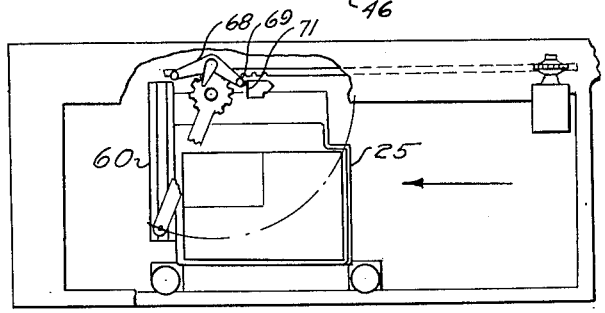

On the first pass of the tray into the screen tunnel, as indicated in Fig. 25, the exposure which will be made corresponds to the quarter section indicated at F in the diagram of Fig. 4. Upon return of the tray to the position shown in Fig. 26, and re-entry of it for the second pass into the tunnel, the exposure will be made on the upper right-hand quarter of the film which corresponds to the section indicated at G in the diagram of Fig. 4. The movement of the tray into the tunnel from the position of Fig. 26 to that of Fig. 27 is occasioned merely by depressing the button 75. Upon release of the button the tray again is retracted to the original position of Figs. 24 and 26.

Figure 26:
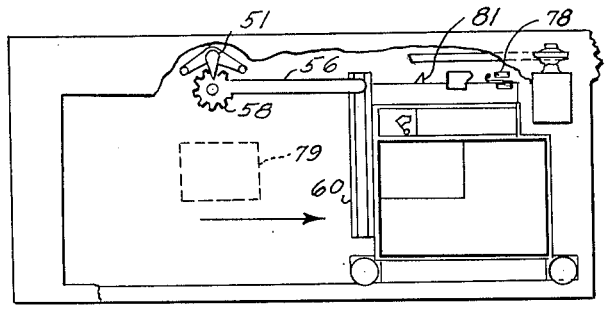
Figure 27:
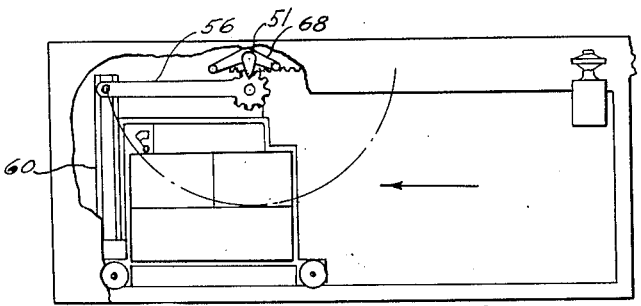
Figure 28:
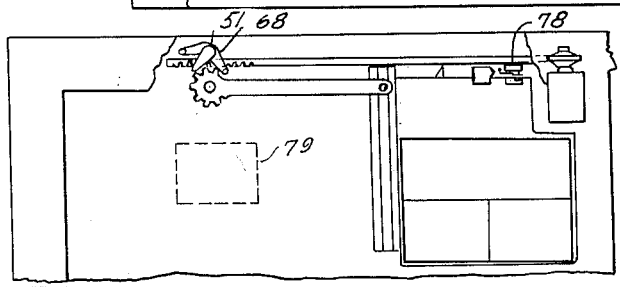

The mechanism for moving the tray a full stroke into the tunnel during the movement from the illustration of Fig. 26 to that of Fig. 27, preferably comprises a device for automatically throwing the pin 69 back to the neutral position, shown by the broken lines 69A of Fig. 12. This is preferably accomplished by a pawl 81 which is pivotally mounted at 82 upon the tray and is biased by a spring 83 into engagement with a stop 84, whereby the pawl is free to swing about its pivot during the forward movement of the tray into the tunnel so as to allow the pin 69 to strike the abutment 71. On the return stroke of the tray, however, the pawl strikes the pin 69 and forces it back to the neutral position. At such time the indexing lever 51 is automatically swung from the dotted line position 51A to the full line position of Fig. 4 and is held in such position by an indexing button 85 which engages the underside of the panel 86. The indexing button is carried by a spring arm 87 which is shown in Figs. 14 and 15 as being affixed to the pin 85. On the second pass of the tray, the position of the indexing lever 51 is not manually altered, as a result of which there is no stop pin interposed in the path of travel of the tray, whereby it may move into the tunnel to its fullest extent. That position is so arranged as to bring the center of the second upper quarter of the film into registration with the radiation beam.

When it is desired to make quarter size exposures on the other half of the film, then the cassette is lifted out of the tray and reversed so as to bring the quarter section indicated at I in Fig. 4 into the position previously occupied by the quarter section indicated at F. This can be quickly done by the operator while the room is in darkness.

To initiate the second sequence of exposures, for the quarter-size sections, the indexing lever is again swung manually to the position 51A in Fig. 4, and the circuit controlling button 75 is again depressed. Thereupon, the tray moves into the tunnel and stops automatically in the proper position for exposure of the quarter section represented by I of Fig. 4. Upon release of the button 75, the tray is automatically retracted and is again automatically stopped at the end of the return stroke. Then to make the exposure for the last quarter, the button is again depressed, whereupon the tray is moved to its fullest extent into the tunnel, thus bringing the quarter section indicated at H in Fig. 4 into registration with the radiation beam. Again, upon release of the button the tray is automatically retracted to the original storage position.

Figure 29:
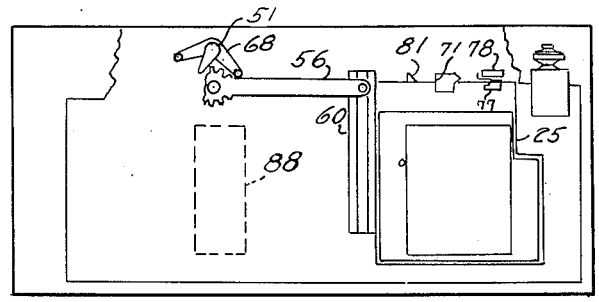
Figure 30:
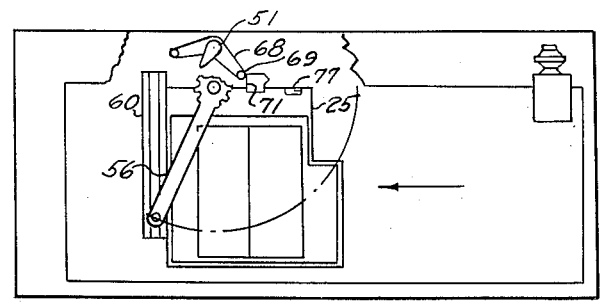
Figure 31:
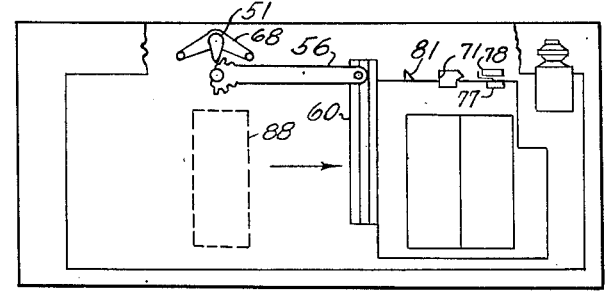

Whenever it is desired to make a record corresponding to the half-sections B and C in the diagram 87 of Fig. 4, then the cassette is mounted vertically in the tray as is indicated in Fig. 29. Again the indexing lever 51 is moved to the left, and upon depressing the button 75, the tray is stopped in the same location as that of Fig. 25. In this case, however, the mask corresponds to a half-section of film, as indicated at 88 in Fig. 29. The forward movement of the tray is illustrated in Fig. 30, where the section B of Fig. 4, is in position for exposure. Upon release of the button 75, the motor is again reversed and the tray is returned to the original position. To expose the other half-section C, the cassette is reversed in the tray as is shown in Fig. 31, and the button 75 is depressed, whereupon the second half of the film is moved to the position shown in Fig. 32, which is the same as that previously occupied by the first half in accordance with the illustration of Fig. 30.

In the event that it is desired to make an exposure on the entire film, or on the half-sections with the long dimension extending in a direction longitudinally of the screen arm, then the cassettes are placed in the tray in the positions corresponding to those illustrated in the diagrams 89 and 90 respectively of Fig. 4.

Figure 33:
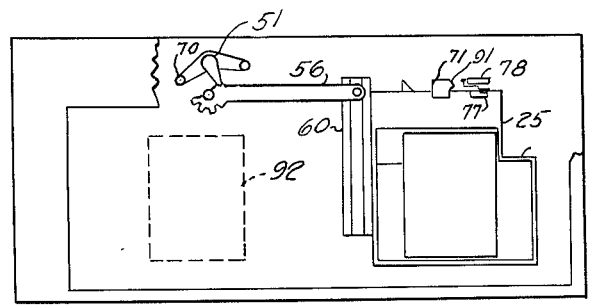
Figure 34:
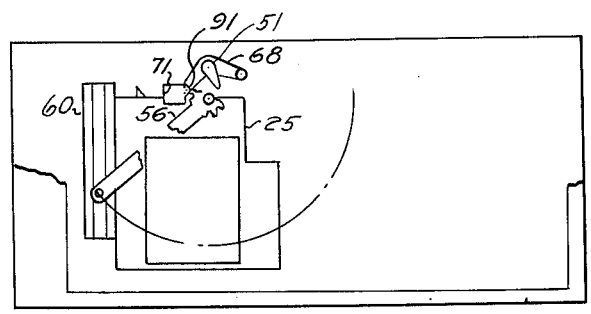
Figure 35:
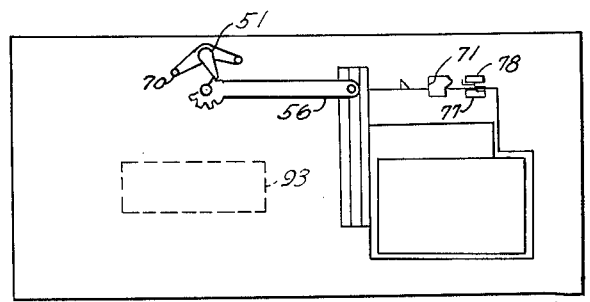
Figure 36:
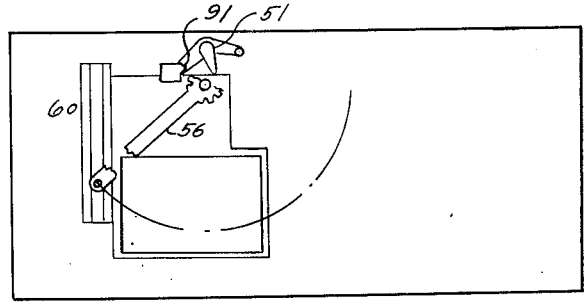

Whenever a full exposure is desired, then with the cassette disposed in the tray in the position illustrated in Fig. 33, and with the indexing lever 51 moved to the broken line position 51B in Fig. 4, and upon depressing the button switch 75, the tray will be moved from the position of Fig. 33 to the position of Fig. 34. Again, upon release of the button the tray will be returned to its initial position. In this instance the mask for the full exposure would be as is indicated at 92 in Fig. 33.

It will be observed that in Fig. 34 the left hand or leading edge of the cassette is disposed further to the left than is the case of Figs. 25 or 30. This is accomplished by allowing the tray to move into the tunnel farther than was the case of the illustration in Fig. 25 and the extent of such movement is accomplished by interposing only the short pin 70 into the path of travel of the tray and arranging to have the pin engage a shoulder 91 on the bracket 72. As is illustrated in Fig. 40, the pin 91 is short enough to clear the horizontal portion of the bracket and also to clear the pawl 81, wherefore, upon release of the button 75 after the exposure has been made, the indexing lever 51 is not automatically returned to the neutral position. This is not necessary, however, for the reason that there is no second sequential exposure required with either of the diagrams represented by 89 and 90 of Fig. 4.

To obtain half-size exposures in accordance with the diagram 90 of Fig. 4, then the cassette is inserted in the tray with the long dimension extending longitudinally of the screen arm, and the indexing lever 51 is moved to the position indicated at 51B of Fig. 4. In this case the mask for the half-section would be as is indicated at 93 in Fig. 35. Upon depressing the circuit controller button 75, the tray is moved from the position indicated in Fig. 35 to that indicatted in Fig. 36, which will place the film in a position for exposing the upper half indicated at D in the diagram 90. Upon release of the circuit controller button, the tray is retracted to the original position, whereupon the tray is reversed in order to place the film in position for exposure of the second half, at which time the portion E in Fig. 90 would be at the top of the diagram. Then with the indexing lever still disposed in the position 51B of Fig. 4, and upon depressing the circuit controller button, the tray is again moved into the position indicated in Fig. 36 for the second exposure. Upon release of the button, the tray is retracted to the original position.

From the foregoing it will be apparent that movement of the indexing lever 51 to the left presets the mechanism for making a sequence of two exposures automatically, whereas moving the indexing lever to the right of Fig. 4 is effective to permit only a single exposure. Accordingly, the operator has a wide choice of exposure sizes merely by swinging the indexing lever to one position or the other—an operation which can be performed readily with a gloved hand.

Another feature of the present invention is the mechanism for automatically holding the screen arm against movement away from the table, but providing for the selective control of such mechanism so as to permit freedom of movement of the arm in either direction whenever desired, and to incorporate such selective control in the latch mechanism for locking the arm to its supporting bracket. Such mechanism is best illustrated in Figs. 19 to 22, inclusive, wherein Fig. 19 shows the screen arm unlatched from the bracket. The mechanism in the preferred form embodies a rack 100 which is fixed to the column 12 and which is adapted to be engaged by a pawl 101 that is pivotally mounted at 102 to a housing 103. The housing is adapted to be fastened to the bracket by securing members 104 and is provided with an opening 105 in a side wall into which the leading end of a rock shaft 106 is adapted to extend. Such leading end carries a cam 107, the normal position of which is shown by the full-line position of Fig. 21 whenever the handle 108 of the rock shaft is disposed substantially parallel to the column 12. At such time the screen arm is latched to the bracket, and the pawl 101 is held out of engagement with the rack 100, whereby the screen arm can be moved freely in either direction along the column.

The mechanism coacting with the pawl 101 includes a pair of spring-like fingers 109 which are carried by the pawl and are adapted to embrace and engage frictionally the side walls of the rack. The friction exerted is sufficient that whenever the pawl 101 is free to move about its pivot, there will be enough force or drag exerted by the spring arms upon the rack to swing the pawl either into or out of engagement with the rack, depending upon the direction of movement of the screen arm with respect to the column. Thus, movement of the arm toward the table will cause the pointed end of the pawl to swing outwardly from the rack to the full line position of Fig. 21, whereas movement of the arm in the opposite direction will swing the tooth of the pawl inwardly to the broken line position, thus effecting engagement with the rack and preventing further movement of the screen arm in that direction.

The mechanism for controlling the force acting upon the pawl consequent upon movement of the screen arm with relation to the table, embodies a lever which is pivoted to the housing at 110 and which includes a downwardly extending arm 111 and a laterally extending arm 112. A spring 113 operates against the arm 111 to swing it outwardly into engagement with the lower portion of the pawl, whenever it is permitted to exert its force against the lever. The force exerted by the spring 113 is greater than that exerted by the spring fingers 109, so that whenever the spring 113 is permitted to act against the lever arm 111 it operates to hold the pawl 101 out of contact with the rack, thereby permitting freedom of movement of the screen arm in either direction along the column. That is the condition which exists when the handle 108 extends parallel to the column as shown in Figs. 1 and 19.

To effect automatic locking action of the pawl against the rack as aforesaid, the handle 108 is swung downwardly through an angle of approximately 45°, which results in a swinging of the cam 107 from the full to the dotted line position 107A in Fig. 21. The result of such movement is to lift the upper arm 112 to the broken line position 112A, thereby swinging the lever about its pivot and moving the arm 111 to the position 111A. Such action moves the arm away from the lower end of the pawl, overcoming the force of the spring 113, and leaves the pawl free to swing about its pivot and to move into or out of engagement with the rack automatically, depending upon the direction of the screen movement along the column, as aforesaid. The handle 108 is retained in the 45° position by virtue of the force with which the lever 112 acts against the top of the cam under the influence of the spring 113 which is constantly acting against the lever to urge the arm 112 downwardly.

The latching device for locking the screen arm to the bracket includes a pin 115 which is yieldably mounted for movement within an ear 116 that extends laterally from the bracket 15. A second ear 117 carries a post 118 which is adapted to engage against a shoulder 119 on the arm and thereby to effect an abutment whenever the screen arm is swung into locking position with the bracket. At such time the latch pin 115 rides over the top of boss 120 and enters an aperture 121 therein to lock the arm to the bracket. During such latching engagement, the handle 108 is preferably positioned vertically as is shown in Fig. 19, at which time a plunger 122 within the boss is retracted sufficiently to admit the pin 115. The plunger is utilized for ejecting the pin from the aperture 121 to permit uncoupling of the arm from the bracket. This may be accomplished by providing a cam 123 on the rock shaft 106 to act upon the plunger and to lift it whenever the handle 108 is swung downwardly through an angle of approximately 90°. A spring 125 acts against the plunger to hold it downwardly within the opening 121.

To facilitate return of the rock shaft to vertical position upon release of manual pressure thereon, there is shown a torsion spring 126 within a housing 127 which may act upon the rock shaft by having one end 128 thereof fastened to the shaft, and having the other end 129 adapted to engage the side wall of the housing whenever the handle is swung downwardly through a predetermined degree. In practice, the spring 126 commences to exert its force after the handle has been swung downwardly about 30°.

From the foregoing description it is to be understood that whenever the screen arm is unlatched from the bracket that the spring 113 is then free to exert its force against the pawl 101 so as to hold it out of contact with the ratchet teeth 100, thereby allowing freedom of movement of the screen arm bracket in either direction along the column.

Figure 32:
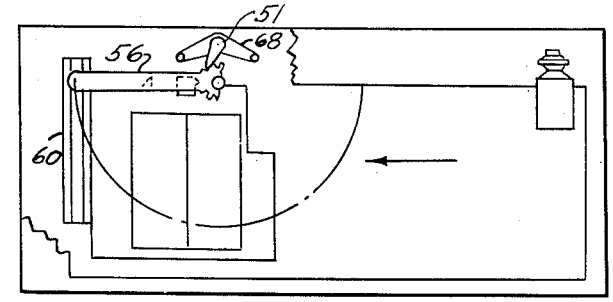
Figure 42:
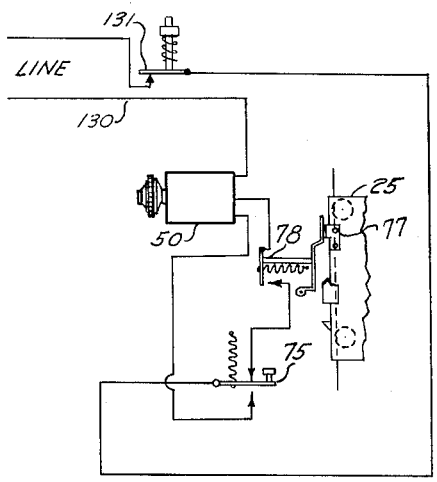
Figure 43:
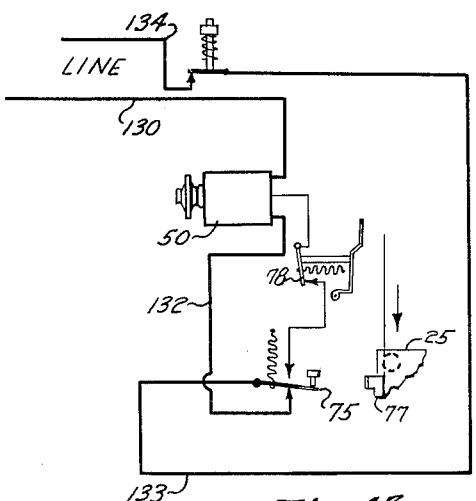
Figure 44:
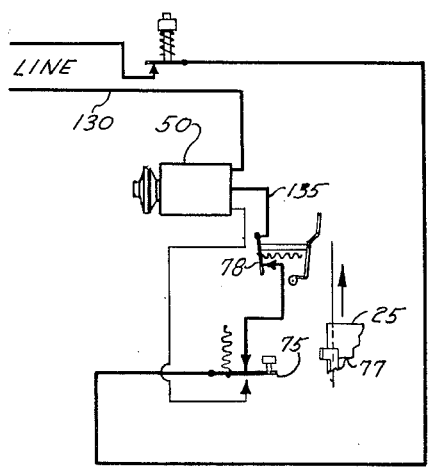
Figure 45:
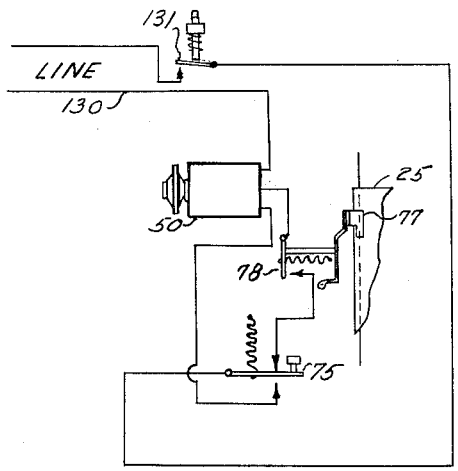
Figure 46:
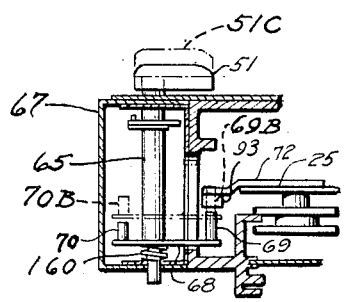

Figs. 42 to 45, inclusive, are wiring diagrams illustrating the position of the parts and the flow of current under various conditions of operation. Thus, Fig. 32 illustrates a condition wherein the tray is in the storage position, as is illustrated in Fig. 1; Fig. 43 shows the tray moving forwardly into the screen tunnel; Fig. 44 shows movement of the tray in the reverse direction and Fig. 45 illustrates the position of Fig. 42, but with the screen arm swung away from the bracket in the position indicated in Fig. 2.

In Fig. 42 and in the other wiring diagrams, the motor, the push-button switch, and the limit switch are indicated by the reference characters heretofore used. The switch 131 illustrates a spring-pressed member which projects from the end of the screen arm, as is shown in Fig. 2 and operates to break the circuit to the line automatically whenever the screen arm is swung away from its supporting bracket. When the tray is in the storage position of Fig. 42, then the switch 75 is in the normal, underpressed position and the limit switch is open, so that current will not flow through the motor for rotation in either direction.

In Fig. 43, the switch 75 has been depressed, whence current flows from the line through conductor 130, motor 50, conductor 132, switch 75, conductor 133 and back to the line 134. At the start the limit switch has been closed, but it is opened automatically as soon as the tray has moved away from the spring arm that forms part of the switch assembly.

In Fig. 44 the switch 75 has been released, thus interrupting the flow of current through the conductor 132, but permitting the flow through conductor 135 as a result of which the direction of motor rotation is reversed. The reverse rotation continues until the tray reaches the position of Fig. 42, where it strikes the arm of the limit switch and opens the circuit through conductor 135, thus stopping the motor.

Fig. 45 shows the same circuit arrangement of Fig. 42 except for the fact that the switch 131 is open, thus interrupting the flow of current through the circuit and preventing operation of the motor so long as the screen arm is swung away from its supporting bracket.

A further feature of the present invention is an arrangement by means of which the lead-rubber protective apron 140 may be disposed either at the end of the screen arm as is shown in Fig. 1, or at the side as is shown in Fig. 3, depending upon the position of the screen arm with respect to the table at the time of use. The upper end of the apron is looped around and is fastened for swinging movement about a tube 141, the support for which includes telescopic members 142 and 143. The former member is attached to a pin 144 which is pivotally mounted within a bracket 145, while the latter is extensible beyond the end of the apron. The bracket is fastened to a screen arm adjacent one corner thereof, while suitable retaining devices 146 and 147 are disposed on the arm, adjacent an end and side respectively thereof, for holding the telescopic member 143 in adjusted position, either along the end or side of the frame as desired. In each case the retainer has a passageway 148 therein into which an arm 149 or 150 of a clip 151 is adapted to extend. A knob 152 facilitates insertion of either arm into the passageway, while spring pressed buttons 153, carried by the member 143, operate to exert sufficient friction to hold the clip in engagement with either retainer.

The distance between the bracket 145 and the retainer 146 is shorter than that between the bracket and the retainer 147. Compensation, however, is made for such difference by virtue of the telescopic construction of the apron support, by means of which the connection can be made readily to either retainer whenever desired.

The modification of Fig. 46 constitutes an arrangement by means of which the tray 25 may be moved forwardly in sequence without necessitating a retraction of the tray to the original position before starting forwardly on the second pass. The arrangement consists in mounting the pin 65 for reciprocation within the housing 67, and utilizing a spring 160 which tends normally to urge the pin to the broken line position 51C, at which time the stop pins 69 and 70 are in the broken line positions 69B and 70B respectively. In such position the stop pins may be interposed into the path of the shoulders on the bracket 72 so as to stop the tray in the first of a sequence of positions in the manner previously described. The extent of permissible movement of the pin 65, however, with respect to the housing is such as to enable the stop pins to clear the lowermost point of the bracket 72 whenever the arm 51 is depressed against the force of the spring 159 to the full line position of Fig. 46.

It is to be understood that in operating the modification of Fig. 46, the push-button switch 75 is maintained in the depressed position, as a result of which, the motor 50 is constantly rotating in a direction tending to move the tray forwardly into the screen tunnel. Accordingly, whenever the arm 51 is depressed sufficiently to enable the stop 69 or 70 to clear the shoulder on the bracket 72, then the tray is free to continue its forward motion until it is stopped automatically in the correct position for the second exposure. Upon the return movement of the tray at the end of the second exposure, the bracket 72 will strike the pin 69 and return the arm 51 to the central position. An advantage of this arrangement is the fact that a second exposure may be made without necessitating a retraction of the tray between two sequential exposures.

In Figs. 47, 48 and 49, provision is made for supporting a customary photo-timing tube 160 in position where normally it will not interfere with fluoroscopic examinations, but will be automatically swept into scanning position (directly over the center of the fluorescent screen) upon movement of the cassette into any exposure position and automatically retracted upon withdrawal of the cassette.

To accomplish the foregoing purpose, the tube is shown as being carried by an arm 161 and as being disposed within a housing 162 which is provided with a scanning aperture 163. The arm 161 is hollow and carries wires 164 which lead to the usual apparatus for controlling the timing of the X-ray tube. The arm is mounted to swing across the top of the fluoroscopic screen and preferably is fixed to a pin 165 which is journalled in a cap 166. The pin carries, at its lower end, a disc-like plate 167, which is adapted releasably to engage a disc 168 of friction material that is affixed to a disc 169, the latter of which is affixed to a drive shaft 170. The members 167, 168 and 169 form a slip-clutch, the tension on which is determined by a spring 171, one end of which bears against the plate 167 and the other of which bears against a ring 172. The latter is positioned within the housing 173 in any suitable way, such as by a retaining ring 174. The drive shaft 170 carries a gear 175 which is adapted to mesh with teeth on the rack bar 54.

The foregoing arrangement is such that whenever the cassette carrier is in the full line position of Fig. 9, the photo-tube arm will be in the full line position of Fig. 47, but that whenever the carrier has moved forwardly a predetermined extent, the tube arm is swung to the position indicated at 161A in Fig. 47. Suitable means for stopping the movement of the tube arm may comprise a pin 180 which is carried by the arm and which extends into a slot 181 in the cap 166, as is shown in Fig. 49. Angular adjustment may be obtained by means of a set screw 185 which is carried by the housing and extends through a slot 186 in the cap.

The adjustment of the tube arm is such that whenever the push-button switch 75 is depressed, the cassette and photo-tube are moved simultaneously. The arc of swing of the photo-tube, however, is less than that of the arm 56, wherefore the tube will be in the desired position over the fluoroscopic area before the cassette reaches any of its various exposure positions. Thus, the tube will always be in the correct timing position notwithstanding the fact that the cassette carrier is capable of occupying several positions for exposure.

To reduce the secondary scattering from a patient to a minimum, a grid is sometimes interposed between the X-ray tube and the film. The present invention contemplates a method of supporting the grid so as to obtain a slight vibration thereof during the exposure and thereby to wipe out the presence of grid lines in the film. This is accomplished by suspending a grid 190 within a frame 191, preferably by springs 192 adjacent the respective corners of the grid and frame and providing a trackway 193 (Fig. 48) along which the frame may be slid between the masking diaphragm 79 and the bottom plate 41.

By utilizing a spring suspension, the grid will be set in vibration upon the abrupt stoppage of the cassette carrier as it strikes either the pin 69 or 70, or as the tray strikes a suitable stop adjacent the end of the frame. By employing springs whose natural frequencies are out of phase at 60 cycles, the grid will vibrate over an amplitude and period which will be non-synchronous and will thus wipe out the presence of grid lines in the film. The vibration, if any, which may be set up in the main frame or housing is of small consequence since it is highly dampened and it usually is in contact with the patient which further tends to dampen it. The absence, however, of a dampening device on the grid causes it to vibrate for a sufficient length of time to achieve the desired purpose during the time of exposure.

An advantage of the present invention is the fact that an examiner may with minimum effort explore an area fluoroscopically and then may quickly and automatically obtain a sequence of radiographic exposures without altering the position of the screen arm and without a loss of time between the exposures. In this connection the examiner may readily select any one of a number of film sizes expeditiously during the course of manipulation of the screen arm, without requiring manipulation of any control member through small increments of movement that might be difficult to select under conditions which prevail during the use of such equipment.

Additional advantages of the present invention are the quietness of operation of the device which is utilized for locking the screen arm against movement away from the table, and the ease by which the locking device may be controlled for selectively disconnecting it or for detachably retaining the screen arm in operating position. Further features are the novel construction of the frame which results in lightness in weight and economy of construction, and the novel supporting arrangement for the lead-rubber protecting apron and the ease by means of which it may be selectively positioned either at the end or along the side of the screen arm.

The swinging photo-timing tube when applied to the present invention is advantageous in that the movement of it occurs automatically, thus obviating the necessity for removal of the right hand from palpating position in order to make the exposure, and is further advantageous in that the tube arm is swung automatically out of the fluoroscopic field at the completion of the exposure.

The particular mounting means for the grid is helpful in that the presence of grid lines in the film is minimized without the necessity for the use of mechanically actuated devices for vibrating the grid.

We claim:

1. In apparatus of the character described, a frame having a trackway carried thereby, a cassette carrier mounted for movement along the trackway between storage and exposure positions, an electric motor, mechanism operably interconnecting the motor and carrier for moving the carrier in either direction along the trackway, and settable means carried by the frame and cooperating with said carrier for selectively engaging and stopping the carrier at a pre-determined point on the trackway.

2. In apparatus of the character described, a frame having a trackway carried thereby, a cassette carrier mounted for movement along the trackway between storage and exposure positions, an electric motor, mechanism operably interconnecting the motor and carrier for moving the carrier in either direction along the trackway, and settable means carried by the frame for selectively interposing any one of a plurality of stops into the path of travel of the carrier, said means operating to engage the carrier upon a sequence of carrier movements to stop the carrier at different positions along the trackway.

3. In X-ray apparatus, a frame having a trackway carried thereby, a cassette carrier mounted for movement along the trackway between storage and exposure positions, an electric motor, mechanism interconnecting said motor and carrier and operating to move the carrier along the trackway in one direction upon rotation of the motor in one direction, said mechanism also operating to move the carrier along the trackway in the opposite direction upon reversal of the direction of motor rotation and means carried by the frame for selectively engaging the carrier and stopping the movement of the carrier at predetermined positions on the frame.

4. In X-ray apparatus, a frame having a trackway extending lengthwise thereof, a cassette carrier movable along the trackway between storage and exposure positions, an electric motor, a circuit therefor, mechanism operably interconnecting the motor and carrier for moving the carrier along said trackway, and a manually operable switch in circuit with the motor, said switch operating to control the direction of motor rotation for selectively moving the carrier in either direction along said trackway.

5. In apparatus of the character described, a frame having a trackway carried thereby, a cassette carrier mounted for movement along the trackway between storage and exposure positions, an electric motor, mechanism operably interconnecting the motor and carrier for moving the carrier along the trackway upon rotation of the motor, and settable means carried by the frame for selectively engaging the carrier and stopping the carrier at one location during its movement in a forward direction along the trackway and for engaging and automatically stopping the carrier in a different location during a succeeding movement of the carrier along the trackway in a forward direction.

6. In X-ray apparatus, a frame having a fluoroscopic screen carried thereby and having a cassette receiving opening therein at one side of the screen, the frame having a trackway extending behind the screen, a cassette carrier mounted for movement along the trackway between storage and exposure positions, an electric motor, mechanism associated with the motor for moving the carrier along the trackway, an arm swingably mounted on the frame and means coacting with the arm and movable therewith for interposing a stop in the path of travel of the carrier, said mechanism including a slip-clutch which operates to hold the carrier into engagement with said stop while the motor continues to rotate.

7. In apparatus of the character described, a frame having a trackway carried thereby, a cassette carrier mounted for movement along the trackway, an electric motor, mechanism including a rack and pinion for moving the carrier along the trackway in one direction upon rotation of the motor in one direction and for moving the carrier in the opposite direction along the trackway upon reversal of the direction of motor rotation, a plurality of stop members carried by the frame and movable with respect thereto, means for selectively positioning said stop members into the path of travel of the carrier for stopping the carrier at a predetermined position on the frame, said mechanism including a clutch by means of which the carrier may be stopped without interrupting the rotation of the motor.

8. In X-ray apparatus, a frame having a fluoroscopic screen carried thereby and having a cassette receiving well disposed alongside the screen, the frame having a trackway extending through the well and behind the screen, a cassette receiving carriage movable along the trackway between storage and exposure positions, an electric motor mounted on the frame, mechanism operatively connecting the motor to the carriage, said mechanism operating to move the carriage in one direction along the trackway upon rotation of the motor in one direction, and to move the carriage in the opposite direction upon reversal of direction of motor rotation, and switch means in circuit with the motor and operable to control selectively the direction of motor rotation.

9. In an X-ray apparatus, a frame having a trackway, a cassette carrier mounted for movement along the trackway between storage and exposure positions, an electric motor, mechanism operably interconnecting the motor and carrier for moving the carrier along the trackway, circuit connections for the motor, a manually operable switch carried by the frame and including a spring actuated push button, said switch operating when held in one position to close a circuit through the motor to rotate it in one direction, and when released to close a circuit through the motor to rotate it in the opposite direction.

10. In an apparatus of the character described, a frame having a trackway carried thereby, a cassette carrier mounted for movement along the trackway between storage and exposure positions, an electric motor, mechanism operably interconnecting the motor and carrier for moving the carrier in either direction along the trackway, settable means carried by the frame for engaging and stopping the carrier at a predetermined location during the first of a sequence of movements of the carrier along the trackway, said means operating automatically to engage and to effect stoppage of the carrier at a different location upon a sequential movement of the carrier along the trackway.

11. In an X-ray apparatus, a frame having a trackway carried thereby, a cassette carrier mounted for movement along the trackway, an electric motor, mechanism including a rack, a pinion and a slip-clutch associated with the motor for moving the carrier along the trackway, a settable member, stops operable by said member and adapted to be interposed into the path of the carrier for stopping it at predetermined different positions along the trackway, and means mounted on the carrier for moving the stops out of the path of travel of the carrier during a return stroke of the carrier along the trackway.

12. In X-ray apparatus, a frame having a trackway thereon, a cassette carrier movable along the trackway, an electric motor having a shaft, a pinion rotatable by said motor, a slip-clutch connection between the pinion and the motor shaft, a rack slidably mounted in the frame and adapted to be moved by the pinion, an arm pivotally mounted on the frame and actuated by the rack, said arm being operatively connected to the carrier, and a selectively settable stop member carried by the frame and operating to stop the carrier at a predetermined point along the trackway.

13. In X-ray apparatus, a frame having a trackway thereon, a cassette carrier mounted for movement along the trackway, an electric motor, mechanism connecting the motor to the carrier and including a slip-clutch, a pinion and a rack in intermeshing engagement and an arm operated by the rack and having a sliding engagement with the carrier, and selectively settable stop means carried by the frame and operating to stop the carrier at selective predetermined points along the trackway.

14. In an apparatus of the character described, a frame having a trackway carried thereby, a cassette carrier mounted for movement along the trackway between storage and exposure positions, an electric motor, mechanism operably interconnecting the motor and carrier for moving the carrier in either direction along the trackway, settable means carried by the frame and including a pair of pins of different length adapted to be selectively interposed into the path of the carrier for stopping it at different locations during its forward travel along the trackway, and means for controlling the operation of the motor.

15. In X-ray apparatus, a fluoroscopic screen arm embodying a frame having side members and end members, the side members comprising extruded shapes having parallel ribs which are adapted to provide a trackway for a cassette carrier, and having other parallel ribs which are adapted to provide a trackway for a radiographic mask.

16. In X-ray apparatus, a frame having a trackway thereon, a cassette carrier mounted for reciprocation along the trackway between storage and exposure positions, an electric motor, settable means interposed into the path of the carrier, said means operating to stop the carrier during the forward movement thereof at a predetermined point along the trackway, and means on the carrier for resetting the settable means automatically upon the return movement of the carrier, said settable means operating automatically upon a succeeding forward movement of the carrier to stop the carrier at a different location along the trackway, and means for stopping the rotation of the motor whenever the carriage reaches a predetermined position in its return travel.

17. In X-ray apparatus, a frame having a trackway thereon, a cassette carrier mounted for movement along the trackway between storage and exposure positions, an electric motor, mechanism operably interconnecting the motor and carrier for moving the carrier along the trackway, settable mechanism cooperating with the carrier and including a member having three settable positions effecting a stoppage of the carrier in any one of three selective positions on the trackway, and means acting upon said settable means to effect an automatic stopping of the carrier in two different positions sequentially, whenever the settable means is initially set in a predetermined one of the three possible positions.

18. In X-ray apparatus, a frame having a trackway carried thereby, a cassette carrier mounted for movement along the trackway, an electric motor, mechanism associated with the motor for moving the carrier along the trackway, a manually operable member carried by the frame and settable to stop the movement of the carrier in one direction at a predetermined point on the trackway, and said member being manually releasable, and said motor operating upon said release to effect automatic movement of the carrier to a second predetermined point on the trackway.

19. In X-ray apparatus, a frame having a trackway carried thereby, a cassette carrier mounted for movement along the trackway, an electric motor, mechanism associated with the motor for moving the carrier in one direction along the trackway, manually operable member mounted on the frame for swinging and reciprocating movement with reference thereto, said member operating when swung with reference to the frame to stop the movement of the carrier at a predetermined point on the trackway, and said member operating when moved in a reciprocatory direction to release the carrier for further movement in the same direction.

20. In apparatus of the character described, a frame having a trackway carried thereby, a cassette carrier mounted for movement along the trackway between storage and exposure positions, an electric motor, a photo-timing tube mounted for movement on the frame between the storage and exposure positions of said carrier and mechanism operably interconnecting the motor and tube and carrier for simultaneously moving the carrier and tube into predetermined cooperating positions on the frame.

21. In apparatus of the character described, a frame having a trackway carried thereby, a cassette carrier mounted for movement along the trackway between storage and exposure positions, an electric motor, mechanism operably interconnecting the motor and carrier for moving the carrier in either direction along the trackway, an arm mounted for swinging movement on the frame between the storage and exposure positions of the carrier and having a photo-timing tube carried thereby and means actuated by the motor for automatically swinging the arm through a predetermined degree upon movement of the carrier along the trackway.

22. In apparatus of the character described, a frame having a fluoroscopic screen carried thereby and having a trackway thereon, a cassette carrier mounted for movement along the trackway, an electric motor, an arm mounted for swinging movement on the frame a photo-timing tube carried by the arm, and mechanism including a rack bar operatively connecting the motor to the arm and carrier respectively, said mechanism including a slip-clutch between the rack and the motor, and a second slip-clutch between the rack and the arm.

23. In apparatus of the character described, a frame, a cassette carrier movable along the frame, means carried by the frame for moving the carrier, other means carried by the frame for abruptly stopping the carrier, a grid having a yieldable connection to the frame, said connection being such as to effect vibration of the grid consequent upon engagement of the cassette carrier with said stopping means, and said connection being such that the vibration is continuous for a sufficient length of time to avoid the presence of grid lines on a film during the normal exposure of the film within said cassette.

EDWIN R. GOLDFIELD.
ROBERT J. STAVA.
EDGAR J. BASTIN.

References Cited in the file of this patent

UNITED STATES PATENTS

| Number | Name | Date |
|---|---|---|
| 1,143,722 | Palmer | June 22, 1915 |
| 1,408,559 | Zulauf | Mar. 7, 1922 |
| 1,636,419 | Hollander | July 19, 1927 |
| 1,651,707 | Irwig | Dec. 6, 1927 |
| 1,828,092 | Wantz et al. | Oct. 20, 1931 |
| 1,953,497 | Nelson | Apr. 3, 1934 |
| 1,957,720 | Nelson | May 8, 1934 |
| 1,982,954 | Grobe | Dec. 4, 1934 |
| 2,107,825 | Humphreys | Feb. 8, 1938 |
| 2,147,601 | Flarsheim | Feb. 14, 1939 |
| 2,186,107 | Haupt | Jan. 9, 1940 |
| 2,189,623 | Bourland | Feb. 6, 1940 |
| 2,277,330 | Kizaur | Mar. 24, 1942 |
| 2,327,603 | Kizaur | Aug. 24, 1943 |
| 2,401,288 | Morgan et al. | May 28, 1946 |
| 2,404,225 | Green | July 16, 1946 |
| 2,456,096 | Wehmer | Dec. 14, 1948 |
| 2,468,381 | Sussin | Apr. 26, 1949 |